(12) United States Patent
Aoki

(10) Patent No.: US 11,184,494 B2
(45) Date of Patent: Nov. 23, 2021

(54) INFORMATION PROCESSING APPARATUS, METHOD, AND RECORDING MEDIUM

(71) Applicant: Junki Aoki, Fukuoka (JP)

(72) Inventor: Junki Aoki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/921,099

(22) Filed: Jul. 6, 2020

(65) Prior Publication Data

US 2021/0014372 A1  Jan. 14, 2021

(30) Foreign Application Priority Data

Jul. 8, 2019 (JP) .............................. JP2019-127162
Jun. 17, 2020 (JP) .............................. JP2020-104708

(51) Int. Cl.
*H04N 1/00* (2006.01)
*G06F 3/12* (2006.01)

(52) U.S. Cl.
CPC ....... *H04N 1/00477* (2013.01); *G06F 3/1207* (2013.01); *G06F 3/1259* (2013.01); *G06F 3/1273* (2013.01); *G06F 3/1204* (2013.01); *G06F 3/1208* (2013.01); *G06F 3/1288* (2013.01)

(58) Field of Classification Search
CPC . H04N 1/00477; G06F 3/1273; G06F 3/1259; G06F 3/1207; G06F 3/1288; G06F 3/1204; G06F 3/1208; G06Q 30/0255

USPC ........................................................ 358/1.13
See application file for complete search history.

(56) References Cited

U.S. PATENT DOCUMENTS

| | | | |
|---|---|---|---|
| 9,720,634 B2 * | 8/2017 | Sakata | G06F 3/1256 |
| 10,580,061 B2 | 3/2020 | Chiyo et al. | |
| 2010/0306249 A1 * | 12/2010 | Hill | G06Q 50/01 707/769 |
| 2014/0211256 A1 * | 7/2014 | Hosotsubo | G06F 3/1219 358/1.15 |
| 2015/0134450 A1 * | 5/2015 | Castelli | G06Q 30/0255 705/14.53 |
| 2015/0356596 A1 * | 12/2015 | Hiramatsu | G06Q 30/0243 705/14.42 |

FOREIGN PATENT DOCUMENTS

| | | |
|---|---|---|
| JP | 2009-129057 | 6/2009 |
| JP | 2011-114697 | 6/2011 |
| JP | 2018-097833 | 6/2018 |

* cited by examiner

*Primary Examiner* — Miya J Williams
*Assistant Examiner* — Darryl V Dottin
(74) *Attorney, Agent, or Firm* — IPUSA, PLLC

(57) ABSTRACT

An information processing apparatus includes a memory that stores a usage history of using an image forming apparatus by a user and a number of times of viewing report information by the user; and circuitry configured to determine an arrangement of the report information relating to a function of an application and display the report information, based on the usage history and the number of times of viewing the report information by the user.

10 Claims, 15 Drawing Sheets

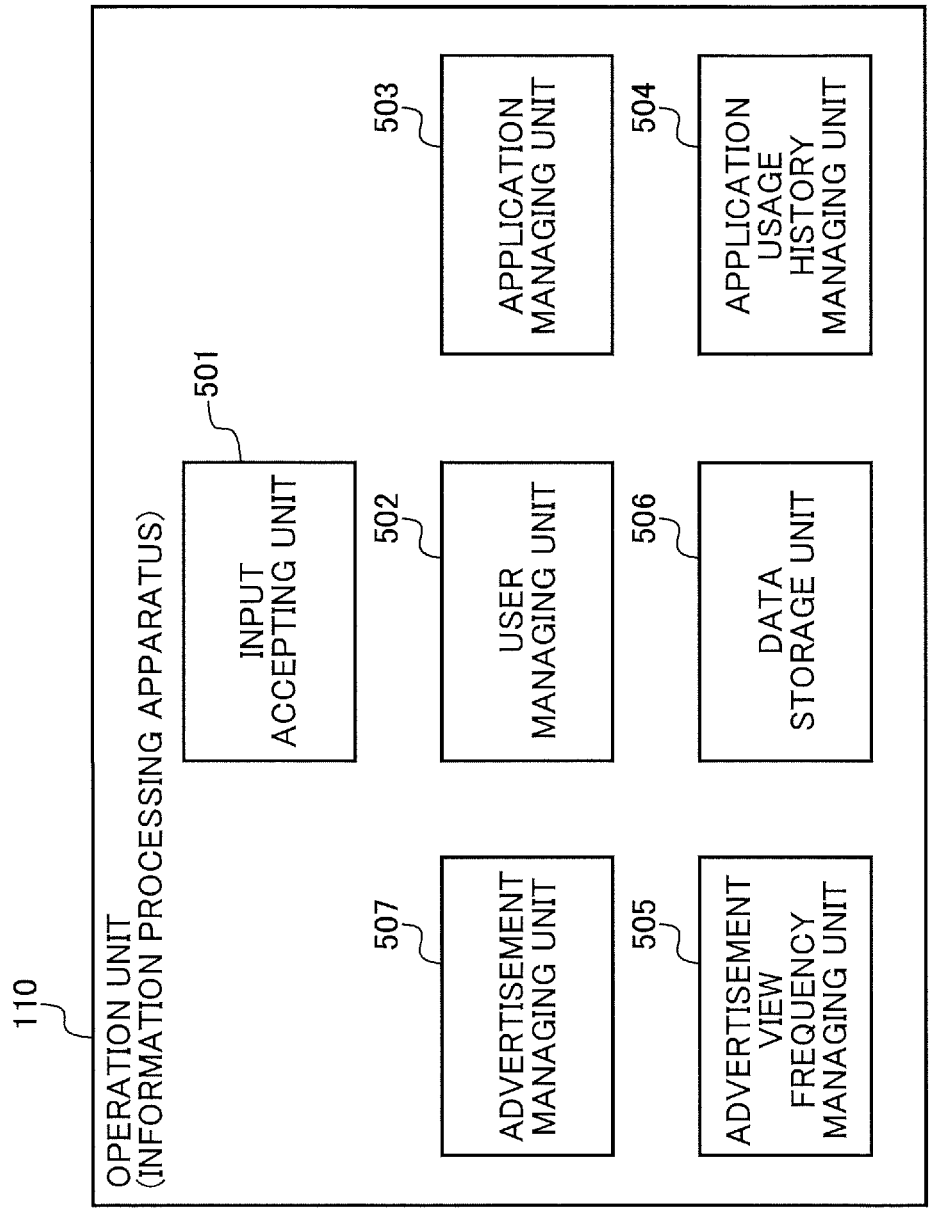

FIG.7

ADVERTISEMENT CONTENT DATA

| ADVERTISEMENT (FUNCTION) | URL | RELEVANCE | | | | | |
|---|---|---|---|---|---|---|---|
| | | COPY APPLICATION A | COPY APPLICATION B | SCANNER APPLICATION | FAX APPLICATION | MANAGEMENT APPLICATION |
| INTERRUPT COPY A | http://XXXXXXXXX | ○ | × | × | × | × |
| INTERRUPT COPY B | http://XXXXXXXXX | × | ○ | × | × | × |
| INTERRUPT COPY C | http://XXXXXXXXX | ○ | ○ | × | × | × |
| FOLDER TRANSMISSION | http://XXXXXXXXX | × | × | ○ | ○ | × |
| LINE-SPECIFIC ADDRESS BOOK | http://XXXXXXXXX | × | × | × | ○ | × |
| INITIAL SETTINGS | http://XXXXXXXXX | × | × | × | × | ○ |

FIG.8

USAGE HISTORY DATA

| USER | APPLICATION | USAGE AUTHORITY | USAGE HISTORY | |
|---|---|---|---|---|
| | | | ACTIVATION OF APPLICATION | EXECUTION OF JOB IN APPLICATION |
| A | COPY APPLICATION | YES | 30 | 10 |
| | SCANNER APPLICATION | YES | 15 | 40 |
| | FAX APPLICATION | YES | 5 | 0 |
| B | COPY APPLICATION | NO | 0 | 0 |
| | SCANNER APPLICATION | YES | 40 | 15 |
| | FAX APPLICATION | YES | 10 | 30 |
| MANAGER | COPY APPLICATION | NO | 0 | 0 |
| | SCANNER APPLICATION | NO | 0 | 0 |
| | FAX APPLICATION | NO | 0 | 0 |
| | MANAGEMENT APPLICATION | YES | 1 | 0 |

FIG.9

VIEW FREQUENCY DATA

| USER | ADVERTISEMENT (FUNCTION) | VIEW FREQUENCY | PRESENCE OF INTENTION TO HIDE | PRESENCE OF TRIAL |
|---|---|---|---|---|
| A | INTERRUPT COPY | 3 | NO | YES |
|  | FOLDER TRANSMISSION | 1 | YES | NO |
|  | LINE-SPECIFIC ADDRESS BOOK | 3 | NO | NO |
| B | INTERRUPT COPY | 0 | NO | YES |
|  | FOLDER TRANSMISSION | 2 | YES | NO |
|  | LINE-SPECIFIC ADDRESS BOOK | 1 | NO | NO |
| MANAGER | INTERRUPT COPY | 1 | NO | NO |
|  | FOLDER TRANSMISSION | 1 | NO | NO |
|  | LINE-SPECIFIC ADDRESS BOOK | 1 | NO | NO |
|  | INITIAL SETTINGS | 1 | NO | NO |

FIG.11

| ADVERTISEMENT CONTENT DATA | | RELEVANCE | | | | |
|---|---|---|---|---|---|---|
| ADVERTISEMENT (FUNCTION) | URL | COPY | SCANNER | FAX | MANAGEMENT |
| INTERRUPT COPY A | http://XXXXXXXXX | ○ | × | × | × |
| INTERRUPT COPY B | http://XXXXXXXXX | × | × | × | × |
| INTERRUPT COPY C | http://XXXXXXXXX | ○ | × | × | × |
| FOLDER TRANSMISSION | http://XXXXXXXXX | × | ○ | ○ | × |
| LINE-SPECIFIC ADDRESS BOOK | http://XXXXXXXXX | × | × | ○ | × |
| INITIAL SETTINGS | http://XXXXXXXXX | × | × | × | ○ |

FIG.12

USAGE HISTORY DATA

| USER | JOB | USAGE AUTHORITY | USAGE HISTORY EXECUTION OF JOB |
|---|---|---|---|
| A | COPY | YES | 30 |
| | SCANNER | YES | 15 |
| | FAX | YES | 5 |
| B | COPY | NO | 0 |
| | SCANNER | YES | 40 |
| | FAX | YES | 10 |
| MANAGER | COPY | NO | 0 |
| | SCANNER | NO | 0 |
| | FAX | NO | 0 |
| | MANAGEMENT | YES | 1 | ns
INFORMATION PROCESSING APPARATUS, METHOD, AND RECORDING MEDIUM

CROSS-REFERENCE TO RELATED APPLICATION

The present application is based on and claims priority under 35 U.S.C. § 119 to Japanese Patent Application No. 2019-127162, filed on Jul. 8, 2019, and Japanese Patent Application No. 2020-104708, filed on Jun. 17, 2020, the contents of which are incorporated herein by reference in their entirety.

BACKGROUND OF THE INVENTION

1. Field of the Invention

The present invention relates to an information processing apparatus, a method, and a recording medium.

2. Description of the Related Art

In the related art, various functions of an image forming apparatus, such as a multifunction peripheral, are conventionally provided by application software (hereinafter, also referred to as an "application") installed in the image forming apparatus. The application in the image forming apparatus can be updated appropriately so that new functions can be added.

There is a technology of recommending various contents (Patent Document 1, etc.). On the operation panel of the image forming apparatus, an advertisement, etc., recommending a function of an application, is displayed.

Patent Document 1: Japanese Unexamined Patent Application Publication No. 2009-129057

SUMMARY OF THE INVENTION

According to one aspect of the present invention, there is provided an information processing apparatus including a memory that stores a usage history of using an image forming apparatus by a user and a number of times of viewing report information by the user; and circuitry configured to determine an arrangement of the report information relating to a function of an application and display the report information, based on the usage history and the number of times of viewing the report information by the user.

BRIEF DESCRIPTION OF THE DRAWINGS

FIG. 6 is a functional block diagram of the operation unit (information processing apparatus) according to a first embodiment of the present invention;

FIG. 7 illustrates an example of data of advertisement content according to the first of the present invention;

FIG. 8 illustrates an example of data on the usage history of using the image forming apparatus according to the first embodiment of the present invention;

FIG. 9 illustrates an example of data on the number of times an advertisement is viewed according to the first embodiment of the present invention;

FIG. 11 illustrates an example of data of advertisement content according to the second embodiment of the present invention;

FIG. 12 illustrates an example of data on the usage history of using the image forming apparatus according to the second embodiment of the present invention;

DETAILED DESCRIPTION OF THE PREFERRED EMBODIMENTS

Figure 1:
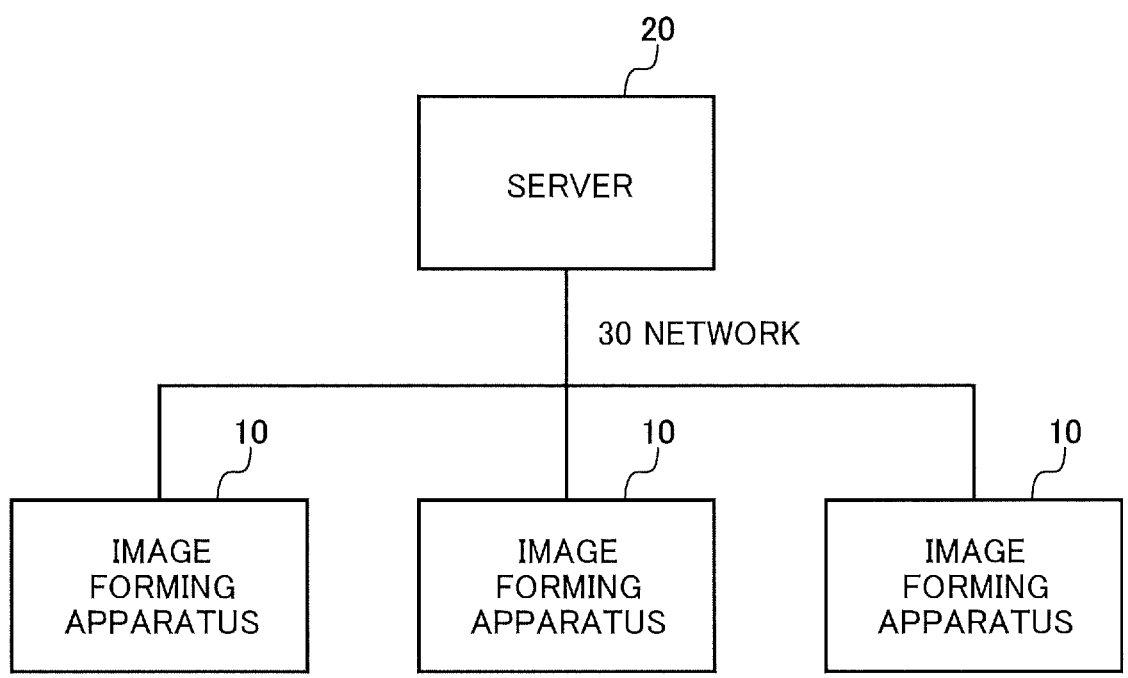
FIG. 1 is an overall configuration diagram according to an embodiment of the present invention.

In the related art, there has been a problem in that advertisements or the like in which the user is not interested and advertisements or the like that the user has already viewed are displayed on the operation panel of the image forming apparatus.

A problem to be addressed by an embodiment of the present invention is to appropriately display report information, such as an advertisement.

Hereinafter, embodiments of the present invention will be described with reference to the accompanying drawings. Hereinafter, an embodiment in which an information processing apparatus according to the present invention is applied to an operation unit of an image forming apparatus such as a multifunction peripheral (MFP) will be described. However, the application destination of the information processing apparatus according to the present invention is not limited thereto, and the information processing apparatus may be applied to elements other than an operation unit (a main body unit, etc.) of the image forming apparatus.

The elements of the information processing apparatus according to the present invention may be applied separately to an operation unit and a main body unit of the image forming apparatus (that is, to an information processing system in which a plurality of apparatuses are communicably connected). Alternatively, the elements of the information processing apparatus may be applied integrally or separately to an apparatus other than the image forming apparatus or elements thereof (that is, to an information processing system in which a plurality of apparatuses are communicably connected).

In the present specification and the drawings, elements having substantially the same functional configuration are denoted by the same reference numerals and overlapping descriptions are omitted.

Although an advertisement of a function of an application will be described as an example in the present specification, embodiments are not limited thereto and may be applied to report information relating to a function of an application.

<System Configuration>

FIG. 1 is an overall configuration diagram according to an embodiment of the present invention. As illustrated in FIG. 1, one or more image forming apparatuses 10 and a server 20 are included. Each of the image forming apparatuses 10 and the server 20 are communicably connected to each other via any network 30. The image forming apparatus 10 and the server 20 will be described below.

The image forming apparatus 10 receives information (hereinafter, also referred to as advertisement content) relating to an advertisement of a function of an application, from the server 20. The image forming apparatus 10 displays an advertisement based on the usage history of using the image forming apparatus 10 by the user and the number of times the advertisement has been viewed by the user (view frequency). An operation unit 110 (information processing apparatus) will be described in detail later with reference to FIG. 6.

The server 20 transmits information (advertisement content) relating to an advertisement of a function of an application to the image forming apparatus 10.

A function of an application is any service using the image forming apparatus 10 implemented by an application of the image forming apparatus 10. The application may be an application installed in the image forming apparatus 10 or may be a web application.

<External Configuration of Image Forming Apparatus>

Figure 2:
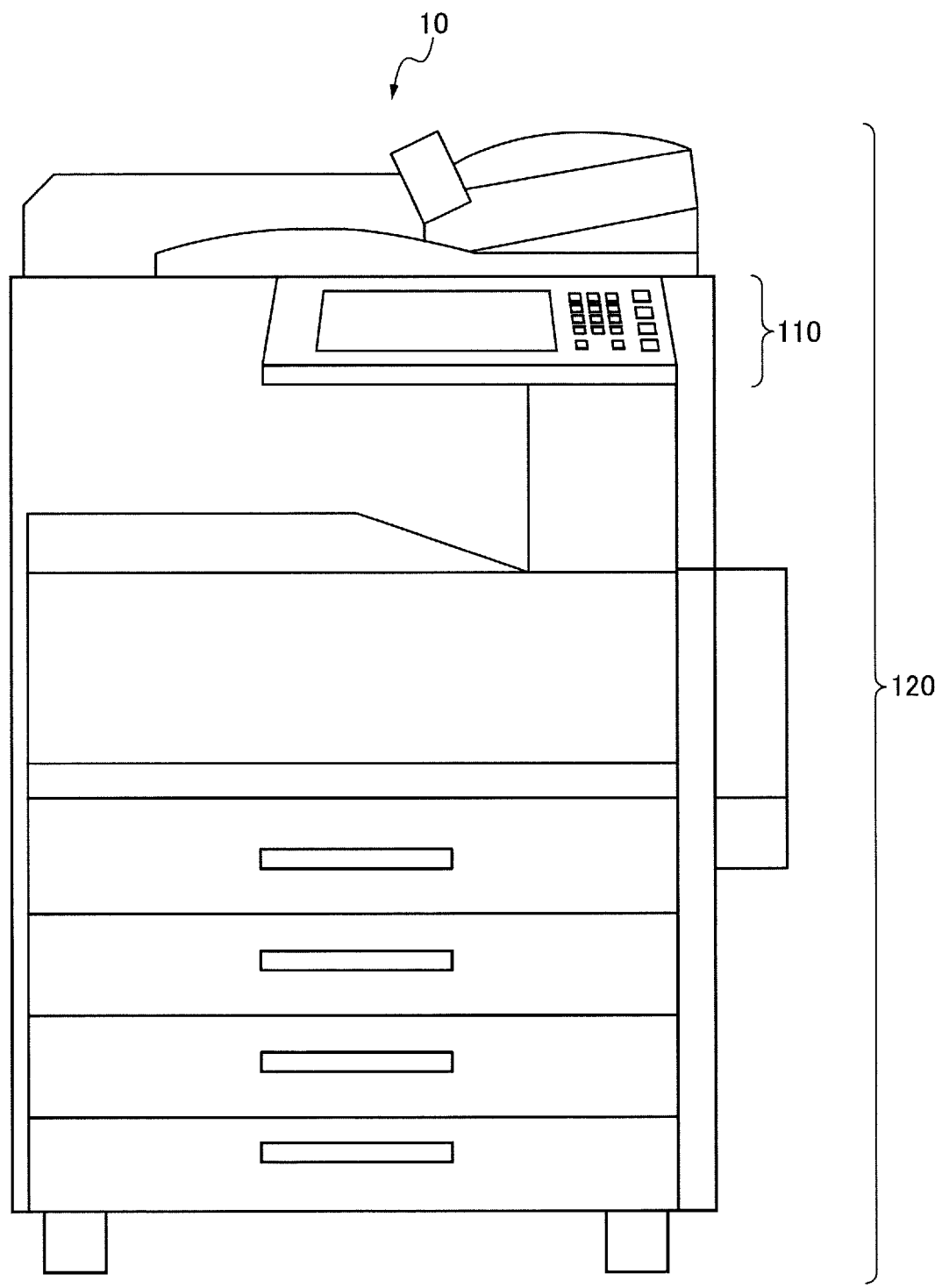
FIG. 2 is a diagram illustrating the external configuration of an image forming apparatus including an operation unit (information processing apparatus) according to an embodiment of the present invention.

FIG. 2 is a diagram illustrating the external configuration of the image forming apparatus 10 including an operation unit (information processing apparatus) according to an embodiment of the present invention.

The image forming apparatus 10 is, for example, a multifunction peripheral (MFP) and has an image processing function such as a copy function, a scanner function, a facsimile function, and a printer function.

As illustrated in FIG. 2, the image forming apparatus 10 includes the operation unit 110 and a main body unit 120.

The operation unit 110 is used when a user performs various operations such as selecting an image processing function to be executed by the main body unit 120, inputting various setting values for executing the image processing function, and inputting execution instructions for executing the image processing function.

The main body unit 120 executes information processing for implementing an image processing function based on various operations by a user on the operation unit 110.

<Hardware Configuration of the Operation Unit and Main Body Unit>

Figure 3:
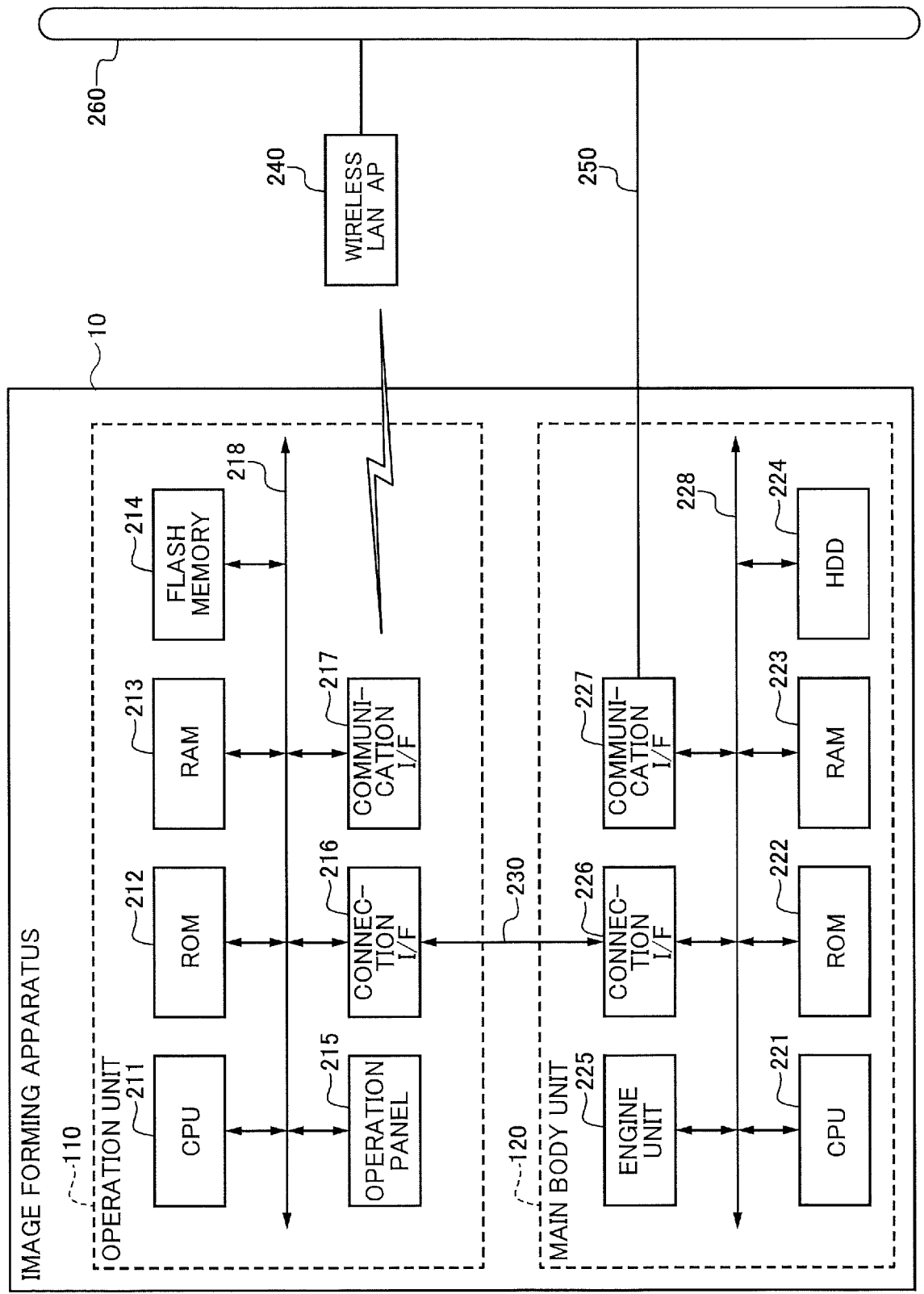
FIG. 3 is a diagram illustrating the hardware configuration of the operation unit and the main body unit of an image forming apparatus according to an embodiment of the present invention.

FIG. 3 is a diagram illustrating a hardware configuration of the operation unit 110 and the main body unit 120 constituting the image forming apparatus 10 according to an embodiment of the present invention.

As illustrated in FIG. 3, the operation unit 110 includes a central processing unit (CPU) 211, a read-only memory (ROM) 212, a random access memory (RAM) 213, a flash memory 214, an operation panel 215, a connection interface (I/F) 216, and a communication I/F 217, and these elements are interconnected via a bus 218.

The CPU 211 executes various programs stored in the ROM 212 or the flash memory 214 by using the RAM 213 as a work area, thereby controlling the entire operation unit 110 and implementing various functions.

The flash memory 214 is a non-volatile storage medium and stores various programs and various kinds of data executed by the CPU 211.

The operation panel 215 includes a display/operation unit and a hardware key for the user to perform various operations. The display/operation unit of the operation panel 215 can further display the internal state of the image forming apparatus 10.

The connection I/F 216 is an interface for communicating with the main body unit 120 via a communication path 230. Here, an interface of the Universal Serial Bus (USB) standard is used.

The communication I/F 217 is an interface for communicating with an external device via a network. In the example of FIG. 3, a wireless connection to a wireless local area network (LAN) access point 240 is made to communicate with an external device via a network 260.

The main body unit 120 includes a CPU 221, a ROM 222, a RAM 223, a hard disk drive (HDD) 224, an engine unit 225, a connection I/F 226, and a communication I/F 227, and these elements are interconnected via a bus 228.

The CPU 221 executes various programs stored in the ROM 222 or the HDD 224 by using the RAM 223 as a work area, thereby controlling the entire main body unit 120 and implementing various functions.

The HDD 224 is a non-volatile storage medium and stores various programs executed by the CPU 221 and various kinds of data.

The engine unit 225 is a hardware element that performs information processing for implementing an image processing function such as a copy function, a scanner function, a facsimile function, and a printer function. The engine unit 225 includes, for example, a scanner for scanning and reading a document, a plotter for printing information onto a sheet material such as paper, and a communicating unit for performing facsimile communication. Further, there may be a finisher for sorting the printed sheet materials, an automatic document feeder (ADF) for automatically feeding the document, or the like.

The connection I/F 226 is an interface for communicating with the operation unit 110 via the communication path 230. Here, an interface of the USB standard is used.

The communication I/F 227 is an interface for communicating with an external device via a network. In the example of FIG. 3, the communication I/F 227 is connected to the network 260 via a fixed line 250.

<External Configuration of Operation Panel>

Figure 4:
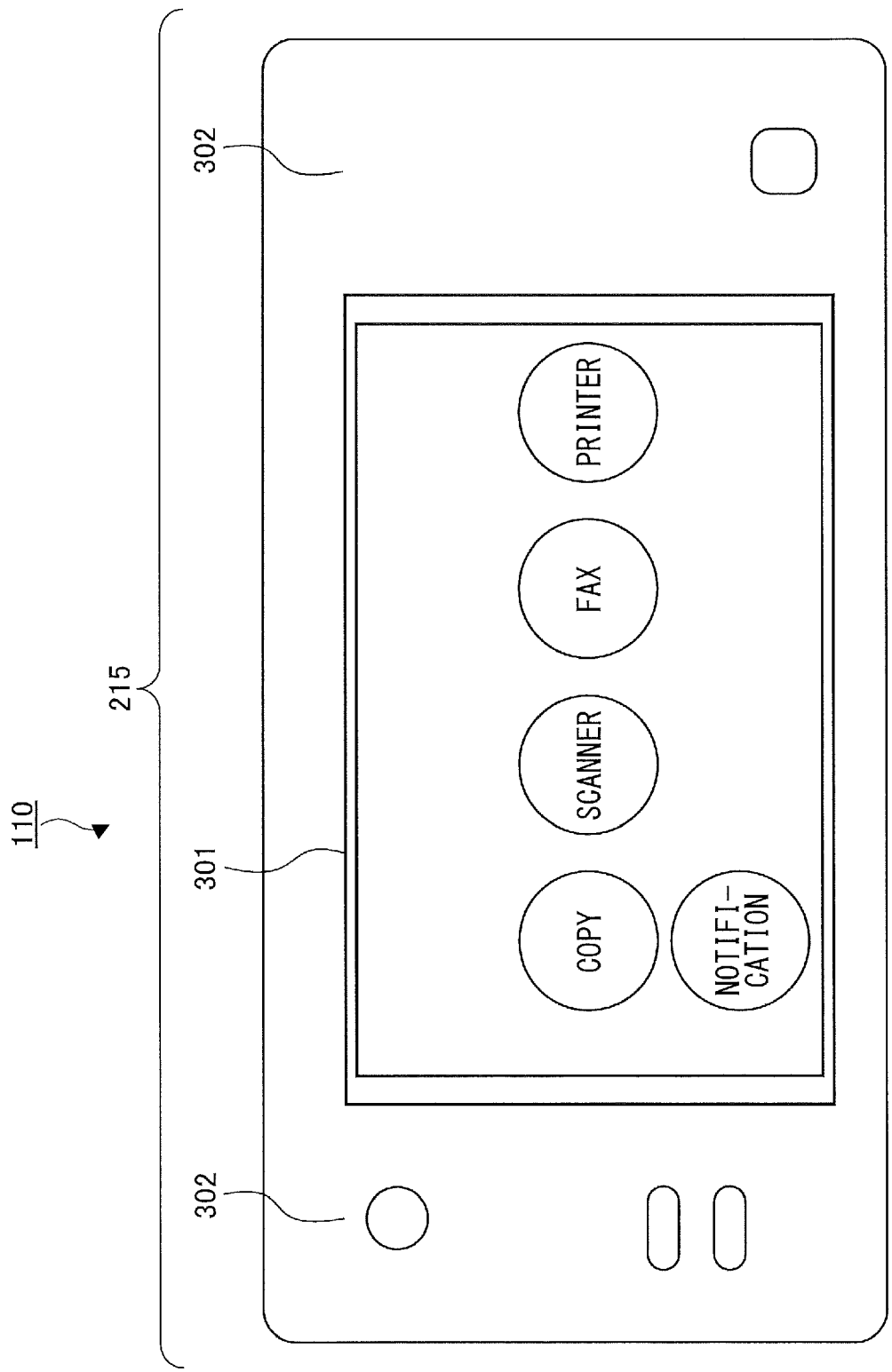
FIG. 4 is a diagram illustrating the external configuration of an operation panel according to an embodiment of the present invention.

FIG. 4 is a diagram illustrating an external configuration of the operation panel 215 of the operation unit 110 according to an embodiment of the present invention.

As illustrated in FIG. 4, the operation panel 215 includes a display/operation unit 301 in which a liquid crystal display (LCD) device and a touch panel are combined, and a hard key 302.

Various display screens are displayed on the LCD device constituting the display/operation unit 301. In the example of FIG. 4, a display screen for executing an image processing function such as a copy function, a scanner function, a fax function, and a printer function is displayed. When the user selects any icon, the touch panel detects the position selected by the user, and an image processing function according to the operation content of the user recognized based on the selected position is executed by the main body unit 120.

In one embodiment of the present invention, an icon (also referred to as a notification icon) for displaying the advertisement of a function of an application, is displayed on the operation panel 215 of the operation unit 110. When the user selects the notification icon, multiple advertisements of functions of applications are displayed.

<Hierarchical Structure of Programs Included in Operation Unit and Main Body Unit>

Figure 5:
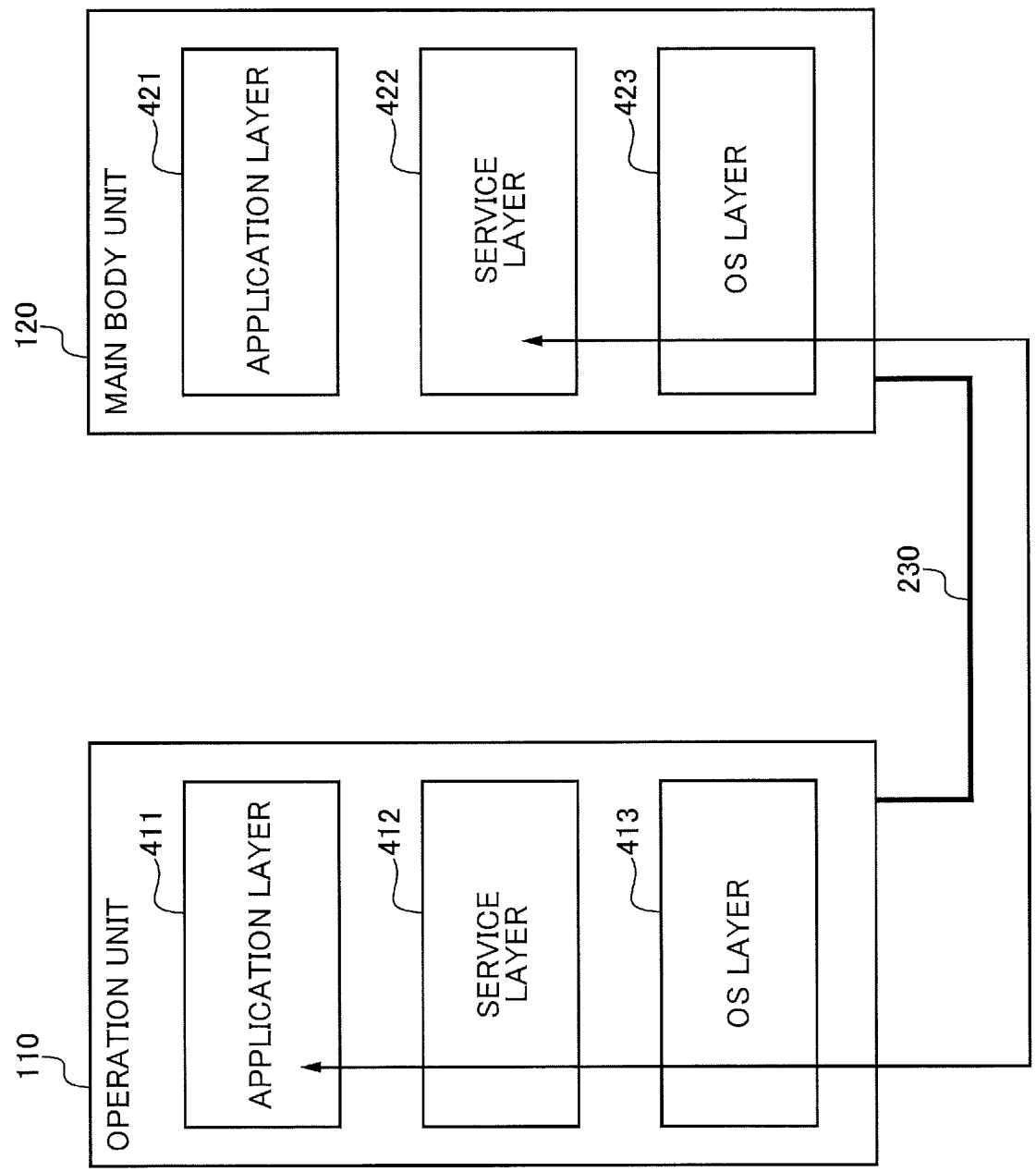
FIG. 5 is a diagram illustrating the hierarchical structure of a program group included in the operation unit and the main body unit according to an embodiment of the present invention.

FIG. 5 is a diagram illustrating the hierarchical structure of a program group included in the operation unit 110 (the ROM 212, the flash memory 214) and the main body unit 120 (the ROM 222, the HDD 224) according to an embodiment of the present invention.

First, a hierarchical structure of a program group included in the main body unit 120 (the ROM 222, the HDD 224) will be described. The program group included in the main body unit 120 can be broadly classified into an application layer 421, a service layer 422, and an operating system (OS) layer 423. The programs classified into the application layer 421 are programs for operating the hardware resources to implement an image processing function. Specifically, a copy application, a scanner application, a facsimile application, a printer application, and the like are included.

The programs classified into the service layer 422 are programs interposed between the application layer 421 and the OS layer 423. These programs serve as an interface for the program of the application layer 421 to utilize the hardware resource provided in the main body unit 120 and for reporting, to the application layer 421, the state of the hardware resource provided in the main body unit 120.

Specifically, the program classified into the service layer 422 accepts an operation request with respect to the hardware resource or arbitrates the accepted operation request. Further, the program classified into the service layer 422 transmits an error detected in the hardware resource to the application layer 421 as an error report. The operation request accepted by the service layer 422 includes an operation request such as reading by a scanner or printing by a plotter.

The function of the program classified into the service layer 422 as the above-described interface, is the same with respect to an application layer 411 of the operation unit 110. That is, the program classified into the application layer 411 of the operation unit 110 can access the service layer 422 to operate the hardware resource of the main body unit 120 and implement the image processing function.

The OS layer 423 is a program referred to as basic software and provides a basic function for controlling the hardware resource provided in the main body unit 120. The program classified into the service layer 422 converts an operation request with respect to the hardware resource, received from the program classified into the application layer 421, into a command that can be interpreted by the OS layer 423 and transfers the command to the OS layer 423. The program classified into the OS layer 423 executes the command, thereby implementing the image processing function according to the operation request for the hardware resource. Further, by executing a program classified into the OS layer 423, an error detected in the hardware resource is received and is transferred to the service layer 422 which transmits an error report to the application layer 421.

Next, a hierarchical structure of a program group included in the operation unit 110 (the ROM 212, the flash memory 214) will be described. Similar to the main body unit 120, the program group included in the operation unit 110 can be broadly classified into the application layer 411, a service layer 412, and an OS layer 413.

However, the function provided by the program classified into the application layer 411 and the type of the operation request that the service layer 412 can accept are different from those of the main body unit 120. The program classified into the application layer 411 of the operation unit 110 mainly provides a user interface function for performing operations and display relating to the image processing function provided by the main body unit 120.

In the present embodiment, the OS operates independently in each of the operation unit 110 and the main body unit 120. Further, if the operation unit 110 and the main body unit 120 can communicate with each other, it is not necessary that the OS is the same type in the operation unit 110 and the main body unit 120. For example, it is possible to use Android (registered trademark) in the operation unit 110 and to use Linux (registered trademark) in the main body unit 120.

As described above, in the image forming apparatus 10, the operation unit 110 and the main body unit 120 are controlled by different OSs. Therefore, communication between the operation unit 110 and the main body unit 120 is not performed as communication between processes within one apparatus, but as communication between different apparatuses.

This includes an operation of transmitting various user operations accepted by the operation unit 110 to the main body unit 120 (command communication) and an operation of transmitting an event (for example, an error report or an error cancellation report) in which the main body unit 120 instructs the operation unit 110 to display the display screen.

<Functional Block>

Hereinafter, the functional blocks of the operation unit 110 (information processing apparatus) will be described separately, as <First embodiment> and <Second embodiment>.

First Embodiment

FIG. 6 is a functional block diagram of the operation unit 110 (information processing apparatus) according to a first embodiment of the present invention. As illustrated in FIG. 6, the operation unit 110 (information processing apparatus) may include an input accepting unit 501, a user managing unit 502, an application managing unit 503, an application usage history managing unit 504, an advertisement view frequency managing unit 505, a data storage unit 506, and an advertisement managing unit 507. The operation unit 110 (information processing apparatus) may function as the input accepting unit 501, the user managing unit 502, the application managing unit 503, the application usage history managing unit 504, the advertisement view frequency managing unit 505, the data storage unit 506, and the advertisement managing unit 507, by executing a program. The data storage unit 506 is implemented by the ROM 212 or the flash memory 214. Each of these elements will be described below.

The input accepting unit 501 accepts input from a user (for example, input for logging in, input for requesting the execution of an application or a job, input for requesting the display of an advertisement, etc.) and requests the user managing unit 502, the application managing unit 503, and the advertisement managing unit 507 to perform a process.

The user managing unit 502 manages the user information. Specifically, the user information is an ID used by the user to log in at the start of use of the image forming apparatus 10. The user managing unit 502 can identify an application that can be used by the user and a job (for example, image processing of copying, scanning, fax transmission, or printing) that the user can cause the image forming apparatus 10 to execute, based on the ID used for the login.

The application managing unit 503 performs a process for executing the application of the image forming apparatus 10.

The application usage history managing unit 504 records the usage history of using the image forming apparatus 10 for a predetermined period (for example, the most recent XXX months) for each user (that is, for each ID used for the login) in the data storage unit 506. Specifically, the application usage history managing unit 504 can record, in the data storing unit 506, at least one of the number of times that the application has been activated and the number of times that the image forming apparatus 10 executes a job (for example, image processing of copying, scanning, fax transmission, or printing) in the activated application.

The advertisement view frequency managing unit 505 records, in the data storage unit 506, the number of times of viewing an advertisement (view frequency) of a function of an application in a predetermined period (for example, the most recent XXX months) for each user (that is, for each ID used for the login). Specifically, the advertisement view frequency managing unit 505 can record, in the data storage unit 506, the number of times the advertisement of the function of the application is displayed.

The data storage unit 506 stores data of the advertisement content (that is, information on the advertisement of the function of the application) acquired from the server 20, data of the usage history of using the image forming apparatus 10, and data of the number of times of viewing of the advertisement (view frequency). Referring to FIGS. 7 to 9, each of these elements will be described in detail.

FIG. 7 illustrates an example of data of the advertisement content according to an embodiment of the present invention. The advertisement content is data received from the server 20 by the advertisement managing unit 507 of the operation unit 110 (information processing apparatus). As illustrated in FIG. 7, the advertisement content may include, for each advertisement, data for items such as "advertisement (function)", "Uniform Resource Locater (URL)", "relevance", and the like.

"Advertisement (function)" indicates the function of an application that appears in an advertisement.

A "URL" indicates a Uniform Resource Locator (URL) used by the operation unit 110 (information processing apparatus) when displaying an advertisement (e.g., a video).

The "relevance" indicates the application to which the function that appears in the advertisement is related (i.e., the application providing the function). Note that that one advertisement (function) may relate to one or more applications.

In FIG. 7, functions that appear in the advertisements, such as "interrupt copy A", "interrupt copy B", "line-specific address book", and "initial settings", may be related to one application. Functions that appear in the advertisements, such as "interrupt copy C" and "folder transmission", may be related to multiple applications.

FIG. 8 is an example of data on the usage history of using the image forming apparatus 10 according to an embodiment of the present invention. As illustrated in FIG. 8, the usage history data may include data for items such as "user", "application", "usage authority", and "usage history" for each user.

A "user" indicates a user identified based on the ID used for the login.

An "application" indicates an application of the image forming apparatus 10.

The "usage authority" indicates whether a user can (is authorized to) use an application. As described above, the user managing unit 502 can identify an application that can be used by the user based on the ID used for the login.

The "usage history" indicates the history of using the image forming apparatus 10 by the user. Specifically, the usage history includes at least one of the number of times the application has been activated and the number of times the image forming apparatus 10 has executed a job (for example, image processing of copying, scanning, fax transmission, or printing) in the activated application.

The usage history data in FIG. 8 and the advertisement content in FIG. 7 are linked based on an "application" in the usage history data in FIG. 8 and an application indicated by "relevance" in the advertisement content in FIG. 7.

FIG. 9 is an example of data on the number of times an advertisement is viewed (view frequency data) according to an embodiment of the present invention. As illustrated in FIG. 9, the view frequency data may include data of items such as "user", "advertisement (function)", "view frequency", "presence of intention to hide", and "presence of trial" for each user.

A "user" indicates a user identified based on the ID used for the login.

An "advertisement (function)" indicates the function of an application that appears in an advertisement.

The "view frequency" indicates the number of times each advertisement of the function of the application is displayed to the user.

The "presence of intention to hide" indicates whether the user has indicated his/her intention not to display (hide) each advertisement for the function of the application. For example, the user may indicate an intention on the screen on which the advertisement for the function of the application is displayed.

The "presence of trial" indicates whether+ the user has tried the function of the application. For example, the user may try a function of an application on the screen on which the advertisement of the function of the application is displayed.

The view frequency data illustrated in FIG. 9 is linked based on the advertisement content illustrated in FIG. 7 based on "advertisement (function)".

Returning to FIG. 6, the advertisement managing unit 507 displays the advertisement received from the server 20, based on the user's usage history of using the image forming apparatus 10 and the number of times the user has viewed the advertisement stored in the data storage unit 506.

For example, the advertisement managing unit 507 can calculate the numerical value of each advertisement using the following (Formula 1) and arrange the advertisement having a large numerical value at a position that is easy for the user to view.

$$\text{"Number of times application relating to advertisement has been activated"} \times m - \text{"number of times advertisement has been viewed"} \times n \quad \text{(Formula 1)}$$

Alternatively, the advertisement managing unit 507 can calculate the numerical value of each advertisement using the following (Formula 2) and arrange the advertisement having a large numerical value at a position that is easy for the user to view.

$$\text{"Number of times that the image forming apparatus 10 has executed a job in the activated application"} \times m - \text{"number of times advertisement has been viewed"} \times n \quad \text{(Formula 2)}$$

Alternatively, the advertisement managing unit 507 can calculate the numerical value of each advertisement using the following (Formula 3) and arrange the advertisement having a large numerical value at a position that is easy for the user to view.

"Sum of the number of times the application relating to the advertisement has been activated and the number of times that the image forming apparatus 10 has executed a job in the activated application"×m–"number of times advertisement has been viewed"×n        (Formula 3)

Thus, in one embodiment of the present invention, an advertisement, which is of a function of an application that is frequently used by a user and which has not yet been viewed by the user, is arranged at a position that is easy to view (that is easily noticed) by the user. Note that m and n of (Formula 1) to (Formula 3) may be any numerical value, and the usage history and the view frequency may be weighted according to the numerical values of m and n.

Second Embodiment

Figure 10:
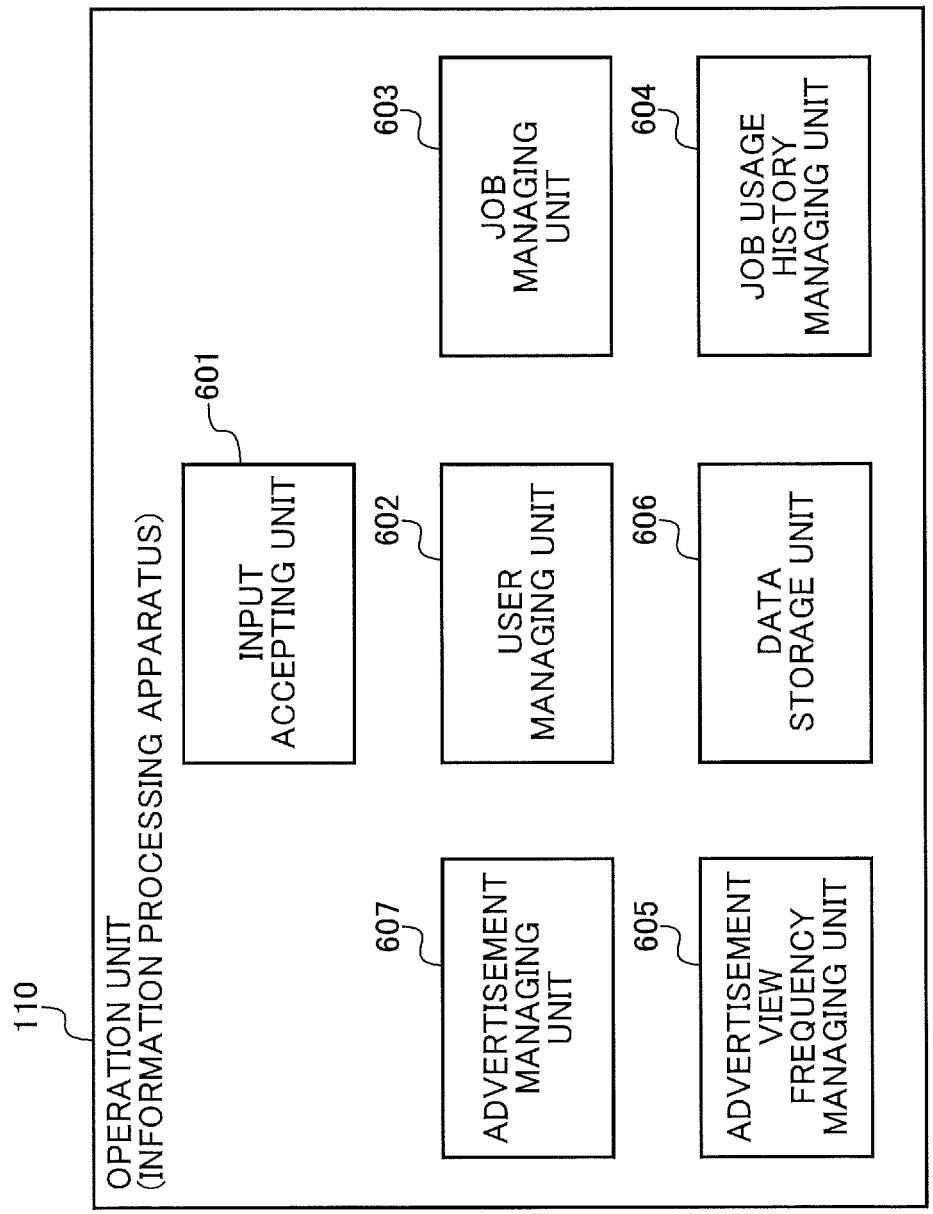
FIG. 10 is a functional block diagram of the operation unit (information processing apparatus) according to a second embodiment of the present invention.

FIG. 10 is a functional block diagram illustrating the operation unit 110 (information processing apparatus) according to a second embodiment of the present invention. As illustrated in FIG. 10, the operation unit 110 (information processing apparatus) may include an input accepting unit 601, a user managing unit 602, a job managing unit 603, a job usage history managing unit 604, an advertisement view frequency managing unit 605, a data storage unit 606, and an advertisement managing unit 607. The operation unit 110 (information processing apparatus) can function as the input accepting unit 601, the user managing unit 602, the job managing unit 603, the job usage history managing unit 604, the advertisement view frequency managing unit 605, and the advertisement managing unit 607 by executing a program. The data storage unit 606 is implemented by the ROM 212 or the flash memory 214. Each of these elements will be described below.

The input accepting unit 601 accepts user input (for example, input for logging in, input requesting to execute a job, input requesting to display an advertisement, etc.) and requests the user managing unit 602, the job managing unit 603, and the advertisement managing unit 607 to perform a process.

The user managing unit 602 manages user information. Specifically, the user information is the ID used by the user to log in at the start of use of the image forming apparatus 10. The user managing unit 602 can identify a job (for example, image processing of copying, scanning, fax transmission, or printing) that the user can cause the image forming apparatus 10 to execute based on the ID used for the login.

The job managing unit 603 performs a process for executing the job of the image forming apparatus 10.

The job usage history managing unit 604 records the usage history of using the image forming apparatus 10 during a predetermined period (for example, the most recent XXX months) for each user (that is, for each ID used for the login) in the data storage unit 606. Specifically, the job usage history managing unit 604 can record the number of times that the image forming apparatus 10 executes a job (for example, image processing of copying, scanning, fax transmission, or printing) in the data storage unit 606.

The advertisement view frequency managing unit 605 records the number of times of viewing an advertisement of the function of the application during a predetermined period (for example, the most recent XXX months) per user (that is, for each ID used for the login) in the data storage unit 606. Specifically, the advertisement view frequency managing unit 605 can record the number of times the advertisement of the function of the application is displayed in the data storage unit 606.

The data storage unit 606 stores the data of the advertisement content (that is, information relating to the advertisement of the function of the application) acquired from the server 20, the data of the usage history of using the image forming apparatus 10, and the data of the number of times of viewing the advertisement. Referring to FIGS. 11 and 12, each of these elements will be described in detail.

FIG. 11 is an example of data of advertisement content according to an embodiment of the present invention. The advertisement content is data received from the server 20 by the advertisement managing unit 607 of the operation unit 110 (information processing apparatus). As illustrated in FIG. 11, for each advertisement, the advertisement content may include data of items such as "advertisement (function) ", "URL", "relevance", and the like.

An "advertisement (function)" indicates the function of an application that appears in an advertisement.

A "URL" indicates a Uniform Resource Locator (URL) used by the operation unit 110 (information processing apparatus) when displaying an advertisement (e.g., a video).

The "relevance" indicates the job to which the function appearing in the advertisement is related (i.e., the job that is used by the function). One advertisement (function) may relate to one or more jobs.

In FIG. 11, functions that appear in the advertisements, such as "interrupt copy A", "interrupt copy B", "line-specific address book", and "initial settings", may be related to one job. Functions that appear in the advertisements, such as "interrupt copy C" and "folder transmission", may be related to multiple jobs.

FIG. 12 is an example of data on the usage history of using the image forming apparatus 10 according to an embodiment of the present invention. As illustrated in FIG. 12, the usage history data may include data for items such as "user", "job", "usage authority", and "usage history" for each user.

A "user" indicates a user identified based on the ID used for the login.

A "job" indicates a job of the image forming apparatus 10.

The "usage authority" indicates whether a user can cause the image forming apparatus 10 to execute a job. As described above, the user managing unit 602 can identify a job that the user can cause the image forming apparatus 10 to execute, based on the ID used for the login.

The "usage history" indicates the history of using the image forming apparatus 10 by the user. Specifically, the usage history is the number of times that the image forming apparatus 10 executes a job (for example, image processing of copying, scanning, fax transmission, or printing).

The usage history data in FIG. 12 and the advertisement content in FIG. 11 are linked based on a "job" in the usage history data in FIG. 12 and the job indicated by the "relevance" in the advertisement content in FIG. 11.

The data of the number of times of viewing of the advertisement in the data storage unit 606 is the same as that of FIG. 9, and, therefore, the description thereof will be omitted.

Returning to FIG. 10, the advertisement managing unit 607 displays the advertisement received from the server 20 based on the user's usage history of using the image forming apparatus 10 and the number of times the user has viewed the advertisement stored in the data storage unit 606.

For example, the advertisement managing unit 607 can calculate the numerical value of each advertisement using the following (Formula 4) and arrange the advertisement having a large numerical value at a position that is easy for the user to view.

> "Number of times job relating to advertisement has been executed by the image forming apparatus 10"×m–"number of times advertisement has been viewed"×n     (Formula 4)

Thus, in one embodiment of the present invention, an advertisement, which is of a function using a job that is frequently used by a user and which has not yet been viewed by the user, is arranged at a position that is easy to view by the user. Note that m and n in (Formula 4) may be any numerical value and the usage history and the view frequency may be weighted according to the numerical values of m and n.

<Processing Method>

Figure 13:
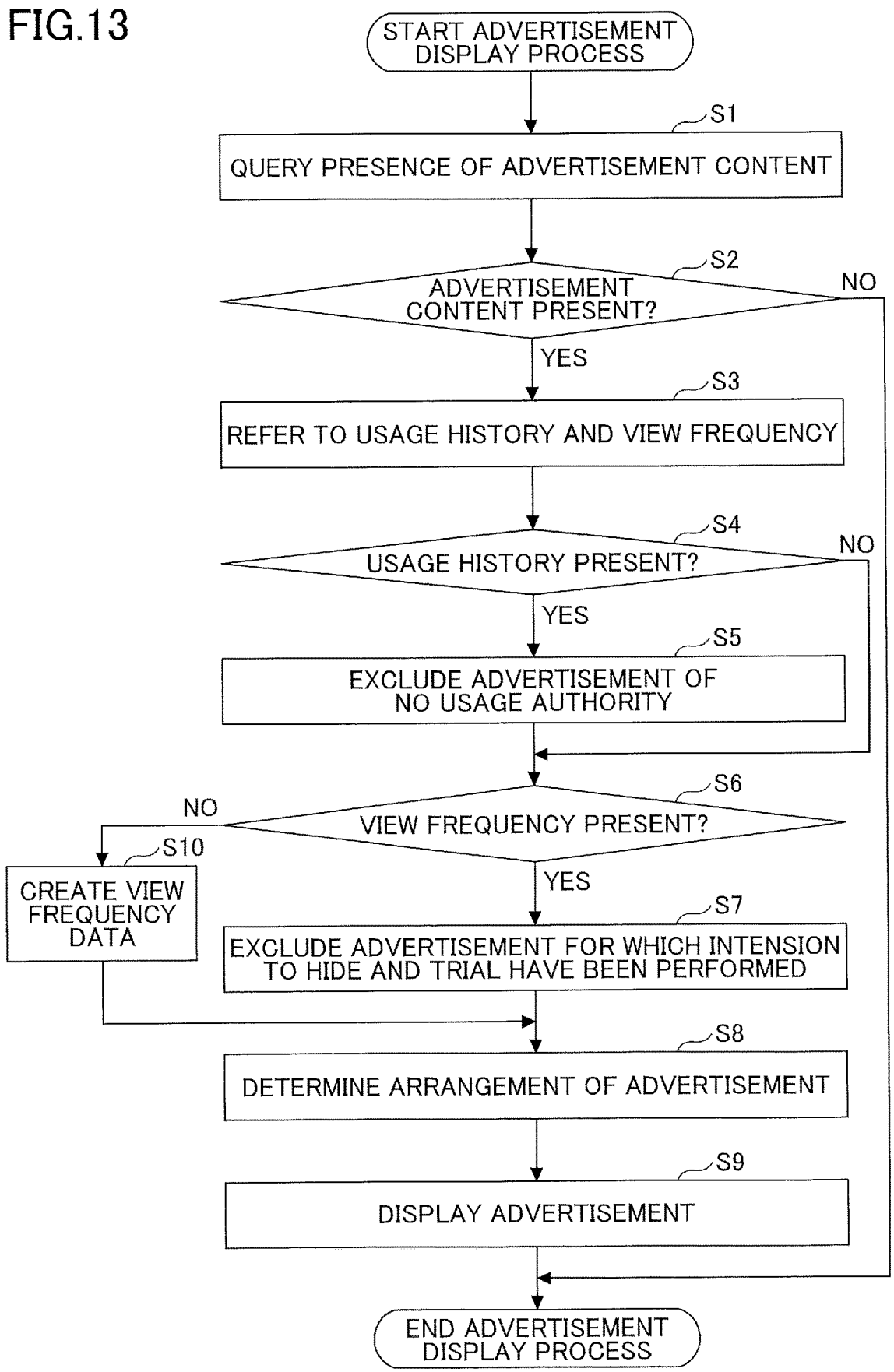
FIG. 13 is a flow chart of displaying an advertisement according to an embodiment of the present invention.

FIG. 13 is a flowchart of displaying an advertisement according to an embodiment of the present invention. It is assumed that the user has logged in using an ID in order to start using the image forming apparatus 10.

In step S1, the advertisement managing unit 507 or 607 of the operation unit 110 (information processing apparatus) sends a query to the server 20 as to whether an advertisement content is present.

In step S2, the advertisement managing unit 507 or 607 determines whether an advertisement content is present as a result of step S1. If there is advertisement content, the advertisement content is acquired and the process proceeds to step S3. If there is no advertisement content, the process ends.

For example, the server 20 may deliver an advertisement for a function added by an application update of the image forming apparatus 10 during a predetermined period of time (e.g., the most recent XXX months).

In step S3, the advertisement managing unit 507 or 607 refers to the user's usage history of using the image forming apparatus 10 and the number of times of viewing the advertisement (view frequency data) in the data storage unit 506 or 606, based on the ID used for the login.

In step S4, the advertisement managing unit 507 or 607 determines whether the user's usage history data of using the image forming apparatus 10 is present, as a result of step S3. If there is usage history data, the process proceeds to step S5. If there is no usage history data, the process proceeds to step S6.

In step S5, the advertisement managing unit 507 or 607 refers to whether the user has a usage authority in the usage history data, and excludes an advertisement of a function of an application for which the user does not have a usage authority (in the case of the first embodiment) or an advertisement of a function using a job for which the user does not have a user authority (in the case of the second embodiment). Thus, in one embodiment of the present invention, an advertisement for a function for which the user does not have a usage authority, is not delivered.

In step S6, the advertisement managing unit 507 or 607 determines whether the data of the number of times of viewing the advertisement by the user (view frequency data) is present, as a result of step S3. If there is view frequency data, the process proceeds to step S7. If there is no view frequency data, the process proceeds to step S10.

If there is no view frequency data in step S6, in step S10, the view frequency data is created and the process proceeds to step S8.

In step S7, the advertisement managing unit 507 or 607 refers to the presence of intention to hide (the advertisement) and the presence of trial with respect to the user in the view frequency data, and excludes an advertisement for which at least one of an intention to hide the advertisement and trial of the function relating to the advertisement has occurred. Thus, in one embodiment of the present invention, an advertisement that the user already knows is not delivered.

In step S8, the advertisement managing unit 507 or 607 determines the arrangement of the advertisement received from the server 20 in steps S1 and S2. Specifically, the advertisement managing unit 507 or 607 can arrange an advertisement, which is of a function that is frequently used by the user and has not yet been viewed by the user, at a position that is easy to view by the user (in the case of the first embodiment). Alternatively, the advertisement managing unit 507 or 607 may arrange an advertisement, which is of a function of a job that is frequently used by the user and which has not yet been viewed by the user, at a position that is easy to view by the user (in the case of the second embodiment). In other words, an advertisement, for which the view frequency is low and for which the usage frequency of (number of times of using) the application or job relating to the advertisement is high, is more likely to be arranged at a position that is easy to view by the user.

In step S9, the advertisement managing unit 507 or 607 displays the advertisement at the arrangement position determined in step S8. Thereafter, the process ends.

<User Interface>

Hereinafter, an example of a screen displayed on the information processing apparatus (for example, the operation panel 215 of the operation unit 110) will be described with reference to FIGS. 14 and 15.

Figure 14:
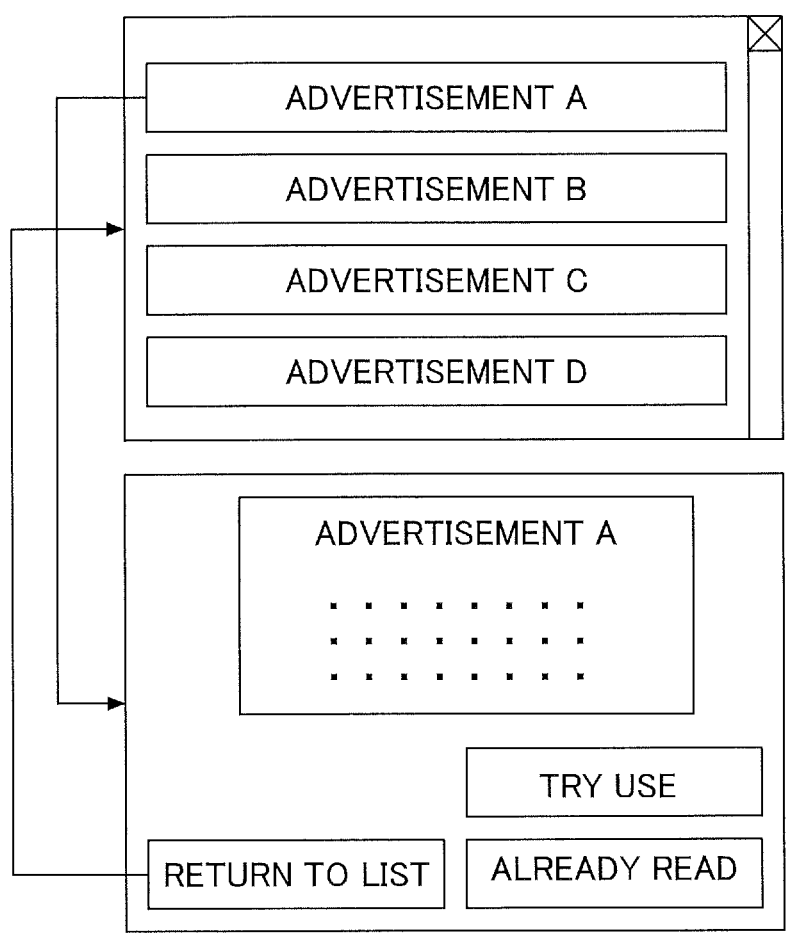
FIG. 14 illustrates an example of a screen according to an embodiment of the present invention (example 1)

FIG. 14 is an example of a screen according to an embodiment of the present invention (example 1). In the upper screen of FIG. 14, a list including the titles of the advertisements is displayed, and in the lower screen of FIG. 14, an advertisement is displayed.

As illustrated in the upper screen of FIG. 14, a list including the titles of the advertisements, etc., (in the example of FIG. 14, a list including "advertisement A", "advertisement B", "advertisement C", and "advertisement D") is displayed. When a user selects an advertisement (in the example of FIG. 14, "advertisement A") from the list, the screen transitions to the lower screen of FIG. 14 (in the example of FIG. 14, the screen of "advertisement A"). When the user selects the "return to list" button on the lower screen in FIG. 14, the screen transitions to the screen in which the list including titles of advertisements, etc., is displayed. In this case, at the beginning of the list, an advertisement that is determined by the advertisement managing unit 507 or the advertisement managing unit 607 to be arranged at a position that is easy to view by the user, is arranged. That is, the beginning of the list is an example of a position that is easy to view by the user.

If the user selects the "already read" button at the bottom of FIG. 14, advertisement A will not be displayed in the list. That is, the selection of the "already read" button in the lower screen of FIG. 14 is an example of the user's indication of his/her intention not to display the advertisement for the function of the application.

When the user selects the "try use" button in the lower screen of FIG. 14, the screen transitions to the screen of the function corresponding to advertisement A. For example, when the user selects the "try use" button while advertisement A introducing an interrupt copy function is displayed, the copy application is activated and a copy screen where the interrupt copy can be executed is displayed. That is, the selection of the "try use" button in the lower screen of FIG. 14 is an example of the user performing trial of the function of the application.

The advertisements may be displayed in a list, and the "already read" button or the "try use" button may be selected from the list.

Figure 15:
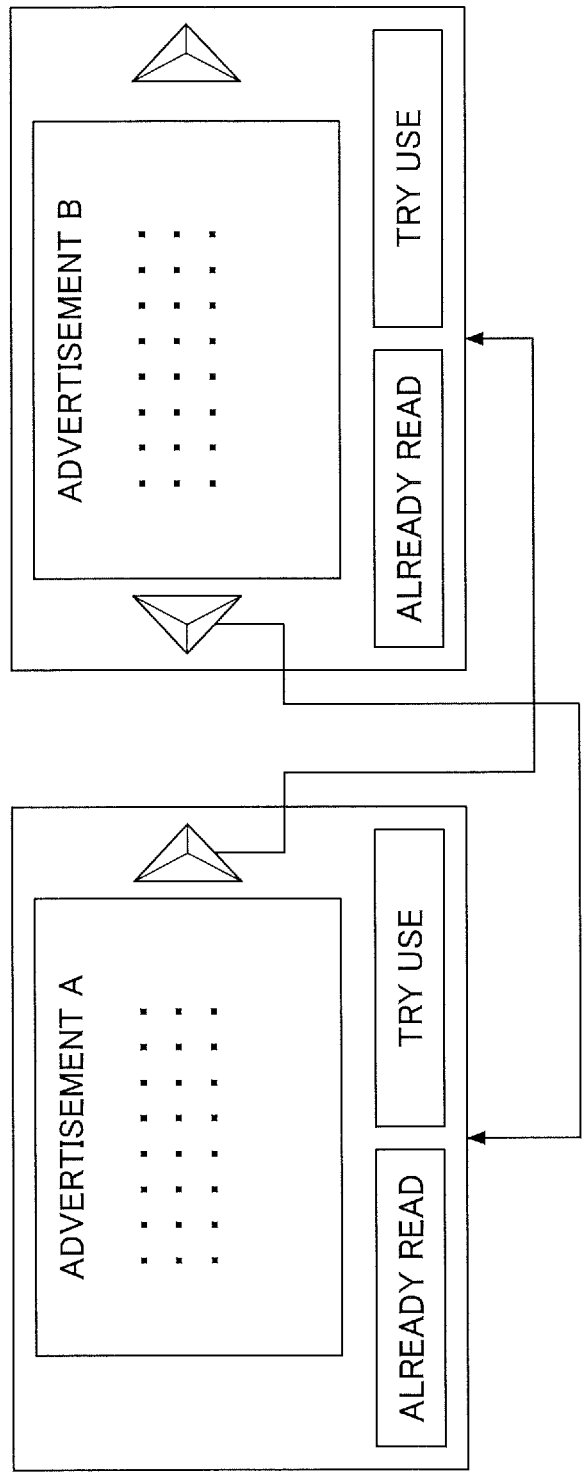
FIG. 15 illustrates an example of a screen according to an embodiment of the present invention (example 2).

FIG. 15 is an example of a screen according to an embodiment of the present invention (example 2). As illustrated in FIG. 15, an advertisement may be displayed on a single screen, and the advertisement may be switched by operating a button or by a flicking operation. In this case, on the first screen (that is, the screen displayed first), an advertisement determined by the advertisement managing unit 507 or the advertisement managing unit 607 to be arranged at a position that is easy to view by the user, is arranged. That is, the first screen is an example of is an example of a position that is easy to view by the user.

If the user selects the "already read" button on the left (or right) screen of FIG. 15, the advertisement A (or the advertisement B) will no longer be displayed, e.g., the next advertisement will automatically be displayed. That is, the selection of the "already read" button on the screen of FIG. 15 is an example of the user's indication of his/her intention not to display the advertisement for the function of the application.

The description of the "try use" button is the same as that in FIG. 14, and, therefore, descriptions thereof will be omitted.

Thus, in one embodiment of the present invention, the advertisement of a function of the image forming apparatus application can be appropriately displayed based on the user's usage history of using the image forming apparatus 10 and the number of times the user has viewed the advertisement. For example, for a user who frequently uses application A, the advertisement of the function of application A can be displayed at the top with higher priority. Further, for a user who has repeatedly viewed an advertisement for the function of application A, the advertisement for the function of application B that has not yet been viewed, can be displayed at the top with higher priority. Therefore, useful information for the user can be provided evenly.

In the present specification, the configuration in which the image forming apparatus 10 includes the operation unit 110 (information processing apparatus) is illustrated as an example. However, the present invention is not limited thereto, and an information processing apparatus such as a tablet terminal, a smartphone, a cellular phone, a Personal Digital Assistant (PDA), or the like can function as an operation unit of the image forming apparatus 10.

The group of apparatuses described in the examples is merely indicative of one of a plurality of computing environments for carrying out the embodiments disclosed herein. In some embodiments, the server 20 includes a plurality of computing devices such as a server cluster. The plurality of computing devices are configured to communicate with each other via any type of communication link, including networks, a shared memory, and the like, and perform the processes disclosed herein.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

Note that the present invention is not limited to the above-described configurations, or combinations of the configurations with other elements. These points may be changed without departing from the scope of the present invention, and may be appropriately determined in accordance with the application form.

According to one embodiment of the present invention, it is possible to appropriately display report information such as an advertisement.

The information processing apparatus, the method, and the recording medium are not limited to the specific embodiments described in the detailed description, and variations and modifications may be made without departing from the spirit and scope of the present invention.

What is claimed is:

1. An information processing apparatus comprising:
a memory that stores a usage history of using an image forming apparatus by a user and a number of times of viewing report information by the user, said report information including advertisement content relating a function of an application, and
circuitry configured to determine an arrangement of the report information relating to the function of the application and display the report information, based on the usage history and the number of times of viewing the report information by the user,
wherein the circuitry is configured to calculate a numerical value of the advertisement content using Formula 1 and determine the arrangement of the report information based on the numerical value, wherein Formula 1 is (number of times the application relating to the advertisement content has been activated)×m−(number of times the advertisement content has been viewed)×n, said m and n being numerical values of weights.

2. The information processing apparatus according to claim 1, wherein the usage history of using the image forming apparatus by the user includes at least one of a number of times the application relating to the report information has been activated and a number of times the image forming apparatus has executed a job in the activated application.

3. The information processing apparatus according to claim 1, wherein the usage history of using the image forming apparatus by the user includes a number of times the image forming apparatus has executed a job relating to the report information.

4. The information processing apparatus according to claim 1, wherein the report information is report information of a function added by an update of the application during a predetermined period.

5. The information processing apparatus according to claim 1, wherein the report information, for which the number of times of viewing the report information is small and for which a number of times of using the application or a job relating to the report information is large, is arranged at a position that is easy to view by the user.

6. The information processing apparatus according to claim 1, wherein the report information, for which at least one of an intention to hide the report information by the user and trial of the function by the user has occurred, is excluded from the arrangement.

7. The information processing apparatus according to claim 1, wherein the report information is displayed on a top of a list.

8. The information processing apparatus according to claim 1, wherein the report information is displayed first on a single screen that shows only one of a plurality of pieces of report information that are switchable by a user's operation.

9. A method executed by an information processing apparatus, the method comprising:
   determining an arrangement of report information relating to a function of an application and displaying the report information on the information processing apparatus, based on a usage history of using an image forming apparatus by a user and a number of times of viewing the report information by the user, said report information including advertisement content relating the function of the application, and
   calculating a numerical value of the advertisement content using Formula 1 and determining the arrangement of the report information based on the numerical value, wherein Formula 1 is (number of times the application relating to the advertisement content has been activated)×m−(number of times the advertisement content has been viewed)×n, said m and n being numerical values of weights.

10. A non-transitory computer-readable recording medium storing a program that causes a computer to execute a process performed in an information processing apparatus, the process comprising:
   determining an arrangement of report information relating to a function of an application and displaying the report information on the information processing apparatus, based on a usage history of using an image forming apparatus by a user and a number of times of viewing the report information by the user, said report information including advertisement content relating the function of the application, and
   calculating a numerical value of the advertisement content using Formula 1 and determining the arrangement of the report information based on the numerical value, wherein Formula 1 is (number of times the application relating to the advertisement content has been activated)×m−(number of times the advertisement content has been viewed)×n, said m and n being numerical values of weights.

* * * * *